US011889566B2

(12) United States Patent
Sassenrath (10) Patent No.: US 11,889,566 B2
(45) Date of Patent: *Jan. 30, 2024

(54) CUSTOMIZED DEVICE PAIRING BASED ON DEVICE FEATURES

(71) Applicant: ROKU, INC., San Jose, CA (US)

(72) Inventor: Carl Sassenrath, Ukiah, CA (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/527,562

(22) Filed: Nov. 16, 2021

(65) Prior Publication Data
US 2022/0078860 A1  Mar. 10, 2022

Related U.S. Application Data

(63) Continuation of application No. 16/049,976, filed on Jul. 31, 2018, now Pat. No. 11,212,847.

(51) Int. Cl.
G10L 15/22 (2006.01)
H04W 76/10 (2018.01)
G06F 3/16 (2006.01)

(52) U.S. Cl.
CPC ............ H04W 76/10 (2018.02); G06F 3/167 (2013.01); G10L 15/22 (2013.01); G10L 2015/223 (2013.01)

(58) Field of Classification Search
None
See application file for complete search history.

(56) References Cited

U.S. PATENT DOCUMENTS 6,097,306 A   8/2000  Leon et al.
7,363,129 B1  4/2008  Barnicle et al.
(Continued)

FOREIGN PATENT DOCUMENTS

CN   104835304 A   8/2015
EP    2627110 A1   8/2013
(Continued)

OTHER PUBLICATIONS

International Search Report and Written Opinion directed to related International Application No. PCT/US2019/041956, dated Oct. 30, 2019; 10 pages.

(Continued)

*Primary Examiner* — Jakieda R Jackson
(74) *Attorney, Agent, or Firm* — Sterne, Kessler, Goldstein & Fox P.L.L.C.

(57) ABSTRACT

Described herein are various embodiments for customized device pairing based on device features. An embodiment operates by receiving, at a first device, a pairing message from a second device requesting a pairing between the second device and the first device. User-accessible features of the second device that are accessible for the pairing, are determined, and a sequence of actions for the pairing are generated based on the user-accessible features of the second device. The sequence of actions are provided for display on a display device communicatively coupled to the first device and independent of the second device. Indicia indicating which actions were performed with respect to the second device are received. The indicia is compared to the displayed sequence of actions. The first device is paired with the second device based on a determination that the indicia corresponds to the displayed sequences of actions.

20 Claims, 4 Drawing Sheets

(56) References Cited

U.S. PATENT DOCUMENTS

| | | | |
|---|---|---|---|
| 7,907,901 B1* | 3/2011 | Kahn | H04W 12/50 455/41.1 |
| 8,630,586 B2* | 1/2014 | Dvortsov | H04W 12/50 455/41.2 |
| 8,769,304 B2 | 7/2014 | Kirsch | |
| 9,185,100 B1* | 11/2015 | Juels | H04W 12/06 |
| 9,297,882 B1 | 3/2016 | Bhatia | |
| 9,301,141 B1 | 3/2016 | Mincher | |
| 9,612,195 B1* | 4/2017 | Friedman | G08B 21/14 |
| 10,009,341 B1* | 6/2018 | Vieux | H04L 9/0863 |
| 10,028,079 B2 | 7/2018 | Seaman | |
| 10,372,388 B2 | 8/2019 | Katano | |
| 11,212,847 B2 | 12/2021 | Sassenrath | |
| 2001/0051033 A1 | 12/2001 | Yoshida et al. | |
| 2003/0193478 A1 | 10/2003 | Ng et al. | |
| 2008/0198422 A1* | 8/2008 | Casey | H04L 41/0686 358/425 |
| 2008/0240440 A1 | 10/2008 | Rose et al. | |
| 2008/0280676 A1 | 11/2008 | Distanik et al. | |
| 2009/0034591 A1 | 2/2009 | Julian et al. | |
| 2010/0167646 A1* | 7/2010 | Alameh | H04W 12/06 455/41.2 |
| 2010/0299390 A1 | 11/2010 | Alameh et al. | |
| 2010/0316209 A1 | 12/2010 | Drovdahl et al. | |
| 2011/0110522 A1 | 5/2011 | Kwon | |
| 2011/0119491 A1 | 5/2011 | Nocera | |
| 2011/0217950 A1 | 9/2011 | Kozlay | |
| 2011/0223862 A1 | 9/2011 | Satoh et al. | |
| 2012/0015605 A1 | 1/2012 | Sole | |
| 2012/0223883 A1 | 9/2012 | Solomon | |
| 2012/0254987 A1 | 10/2012 | Ge et al. | |
| 2012/0270497 A1* | 10/2012 | Merrill | H04L 67/131 455/41.1 |
| 2012/0306794 A1 | 12/2012 | Prest et al. | |
| 2013/0173070 A1* | 7/2013 | Tennyson | G05B 19/02 700/284 |
| 2013/0176246 A1 | 7/2013 | Kohigashi et al. | |
| 2013/0210357 A1 | 8/2013 | Qin et al. | |
| 2013/0225127 A1 | 8/2013 | Cavacuiti et al. | |
| 2013/0247117 A1 | 9/2013 | Yamada et al. | |
| 2013/0295848 A1 | 11/2013 | O'Neill et al. | |
| 2014/0046664 A1 | 2/2014 | Sarkar et al. | |
| 2014/0068408 A1* | 3/2014 | Le Chevalier | G06F 16/93 715/234 |
| 2014/0080416 A1 | 3/2014 | Seo et al. | |
| 2014/0119407 A1 | 5/2014 | Miller | |
| 2014/0179228 A1 | 6/2014 | Maffetone | |
| 2014/0287686 A1 | 9/2014 | Kobayashi | |
| 2014/0304366 A1 | 10/2014 | Fletcher | |
| 2015/0009043 A1* | 1/2015 | Quinlan | A63B 24/0062 340/870.3 |
| 2015/0163843 A1 | 6/2015 | Zhu et al. | |
| 2015/0180842 A1 | 6/2015 | Panther | |
| 2015/0202377 A1 | 7/2015 | Haupt | |
| 2015/0215770 A1* | 7/2015 | Chan | H04W 4/21 455/456.1 |
| 2015/0256957 A1 | 9/2015 | Kim et al. | |
| 2015/0286813 A1* | 10/2015 | Jakobsson | G06F 21/35 726/9 |
| 2015/0287256 A1 | 10/2015 | Davis | |
| 2015/0312951 A1* | 10/2015 | Locker | H04W 4/80 455/41.2 |
| 2015/0357133 A1* | 12/2015 | Keirstead | H01H 23/04 200/339 |
| 2015/0378938 A1 | 12/2015 | Lyman | |
| 2016/0049052 A1* | 2/2016 | Cheatham, III | H04W 4/029 348/14.16 |
| 2016/0105923 A1 | 4/2016 | Chen et al. | |
| 2016/0118036 A1* | 4/2016 | Cheatham, III | H04M 11/025 380/252 |
| 2016/0124535 A1 | 5/2016 | Murphy | |
| 2016/0127900 A1 | 5/2016 | Archibald et al. | |
| 2016/0128114 A1 | 5/2016 | Moy et al. | |
| 2016/0135046 A1 | 5/2016 | Archibald et al. | |
| 2016/0192407 A1 | 6/2016 | Fyfe et al. | |
| 2016/0286468 A1 | 9/2016 | Wang et al. | |
| 2016/0320929 A1 | 11/2016 | Murphy | |
| 2016/0366662 A1 | 12/2016 | Kobayashi et al. | |
| 2016/0373909 A1* | 12/2016 | Rasmussen | H04W 4/80 |
| 2017/0019935 A1 | 1/2017 | Palin et al. | |
| 2017/0061074 A1 | 3/2017 | Singh et al. | |
| 2017/0080896 A1* | 3/2017 | Whitaker | G07C 9/00309 |
| 2017/0105055 A1 | 4/2017 | Lee et al. | |
| 2017/0112716 A1* | 4/2017 | Rawls-Meehan | A61H 23/0263 |
| 2017/0199661 A1 | 7/2017 | Murphy | |
| 2017/0212631 A1* | 7/2017 | Kim | G06F 3/04883 |
| 2017/0256160 A1 | 9/2017 | Zhang et al. | |
| 2017/0295422 A1* | 10/2017 | Chalmers | H04R 1/1041 |
| 2017/0349329 A1* | 12/2017 | McCarthy | B65D 41/04 |
| 2018/0020350 A1* | 1/2018 | Vissa | G06F 3/017 |
| 2018/0032299 A1 | 2/2018 | Liu et al. | |
| 2018/0091932 A1 | 3/2018 | Kwon | |
| 2018/0099643 A1 | 4/2018 | Golsch et al. | |
| 2018/0167373 A1 | 6/2018 | Anderson et al. | |
| 2018/0178671 A1* | 6/2018 | Ji | B60L 3/12 |
| 2018/0219943 A1 | 8/2018 | Gummig | |
| 2018/0285029 A1 | 10/2018 | Yokoyama | |
| 2018/0352070 A1* | 12/2018 | Eichfeld | H04N 21/41265 |
| 2019/0086955 A1* | 3/2019 | Li | G06F 1/3271 |
| 2019/0094957 A1* | 3/2019 | Nelson | A63F 9/24 |
| 2019/0150204 A1 | 5/2019 | Hintermeister et al. | |
| 2019/0187861 A1 | 6/2019 | Yang | |
| 2019/0231222 A1 | 8/2019 | Ahmad et al. | |
| 2019/0372988 A1 | 12/2019 | Schirdewahn et al. | |
| 2020/0045751 A1 | 2/2020 | Sassenrath | |
| 2020/0137169 A1 | 4/2020 | Warrick et al. | |

FOREIGN PATENT DOCUMENTS

| | | |
|---|---|---|
| JP | 2010124286 A | 6/2010 |
| KR | 20100129586 A | 12/2010 |
| KR | 20140002785 A | 1/2014 |
| WO | WO 2008119050 A2 | 10/2008 |

OTHER PUBLICATIONS

International Preliminary Report on Patentability directed to related International Application No. PCT/US2019/041956, dated Feb. 2, 2021; 8 pages.

European Search Report directed to related European Application No. 1984494301, dated Mar. 28, 2022; 9 pages.

* cited by examiner

CUSTOMIZED DEVICE PAIRING BASED ON DEVICE FEATURES

CROSS REFERENCE TO RELATED APPLICATIONS

This application is a continuation of patent application Ser. No. 16/049,976 titled "More Secure Device Pairing," filed Jul. 31, 2018, which is herein incorporated by reference in its entirety.

This application is also related to U.S. patent application Ser. No. 15/341,552 titled "Improved Reception Of Audio Commands," filed Nov. 2, 2016; U.S. patent application Ser. No. 15/646,379 titled "Controlling Visual Indicators In An Audio Responsive Electronic Device, and Capturing and Providing Audio Using an API, By Native and Non-Native Computing Devices and Services," filed Jul. 11, 2017; and U.S. patent application Ser. No. 15/895,047 titled "Trigger Word Detection With Multiple Digital Assistants," filed Feb. 13, 2018, all of which are herein incorporated by reference in their entireties.

BACKGROUND

Field

This disclosure is generally directed to pairing electronic devices.

Background

There is often a need to pair electronic devices, such as adding a device to a WIFI network, or enabling a remote control to work with a TV.

There are a number of existing approaches for pairing electronic devices. In the PIN approach, for example, the user keys in a code at the new device (that is, the device that is being added). In the push button approach, the user pushes a special button on the new device. Doing so opens a discovery or pairing window during which time the new device is automatically paired. Both the PIN and push button approaches are part of the WIFI Protected Setup (WPS) standard developed by the WIFI Alliance.

But there are technical challenges with these conventional approaches. For example, many modern electronic devices do not have keypads. The PIN approach does not work with such keypad-less devices.

Also, today's world is cluttered with networks and electronic devices. The push button approach, while simple, risks incorrectly pairing the new device with an unintended network or other device that, by happenstance or through malfeasance, has a pairing window open at the same time. For example, a user may wish to pair a newly purchased remote control with his TV. But, because of the simplicity and limits of the push button approach, the remote control may instead be paired with the TV or other device belonging to the user's next door neighbor.

SUMMARY

Provided herein are various embodiments, and/or combinations and sub-combinations of embodiments, for customized device pairing based on device features. In embodiments, "pairing" refers to establishing wireless communication between two or more electronic devices.

An embodiment operates by receiving, at a first device, a pairing message from a second device requesting a pairing between the second device and the first device. User-accessible features of the second device that are accessible for the pairing, are determined, and a sequence of actions for the pairing are generated based on the user-accessible features of the second device. The sequence of actions are provided for display on a display device communicatively coupled to the first device and independent of the second device. Indicia indicating which actions were performed with respect to the second device are received. The indicia is compared to the displayed sequence of actions. The first device is paired with the second device based on a determination that the indicia corresponds to the displayed sequences of actions.

In some embodiments, a method is provided. In some embodiments, a system including a memory and at least one processor coupled to the memory and configured to perform operations is provided. In some embodiments, a non-transitory processor-readable medium having one or more instructions operational on a client device which, when executed by a processor, cause the client device to perform operations is provided.

In some embodiments, the electronic device also includes a motion sensor, and the sequence includes one or more movements that the user is required to perform using the electronic device to pair the electronic device with the other electronic device.

In some embodiments, the sequence specifies timing before, between and/or after at least some of the actions.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
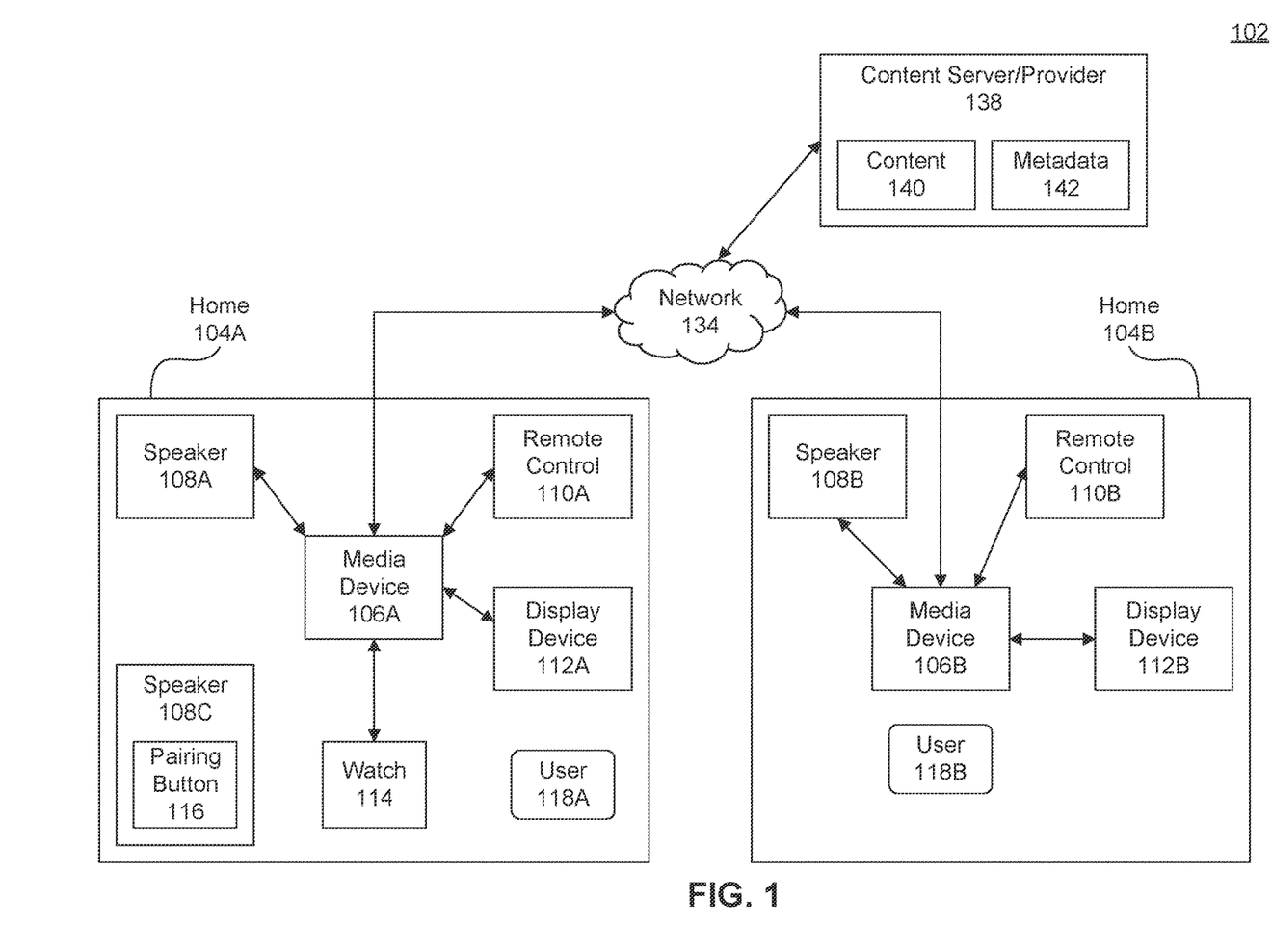
FIG. 1 illustrates a block diagram of a multimedia environment in which electronic devices are paired, according to some embodiments.

FIG. 1 illustrates a block diagram of a multimedia environment 102, according to some embodiments. In a non-limiting example, multimedia environment 102 is directed to streaming and playing content such as movies, TV shows, games, audio books, and music, to name just some examples.

The example multimedia environment 102 of FIG. 1 illustrates two homes 104. In practice, of course, multimedia environment 102 may include any number of homes 104.

Homes 104 each includes a media device 106. In an embodiment, media device 106 is a streaming media device. However, this disclosure is not limited to that example embodiment. Instead, media device 106 may be a DVD device, audio/video playback device, cable box, appliance, internet of things (IoT) device, digital video recording device, speaker, wearable such as a watch or glasses, etc.

In the example of FIG. 1, home 104A includes a number of electronic devices that are paired or otherwise electrically coupled to media device 106A, such as a speaker 108A, remote control 110A, display device 112A, and watch 114. (A second speaker 108C is shown in home 104A but not yet paired with the media device 106A.) Similarly, home 104B includes a speaker 108B, remote control 110B and display device 112B that are paired or otherwise electrically coupled to media device 106B. It is noted that, herein, "electronically coupled" refers to a wired or wireless connection, or a combination of a wired and wireless connection.

Display device 112 may be a monitor, television, computer, smart phone, tablet, wearable (such as a watch), and/or projector, to name just a few examples. In some embodiments, a given display device 112 can be can be a part of, integrated with, operatively coupled to, and/or connected to its respective media device 106.

Each media device 106 may be configured to communicate with network 134. In various embodiments, the network 134 can include, without limitation, wired and/or wireless intranet, extranet, Internet, cellular, Bluetooth and/or any other short range, long range, local, regional, global communications network, as well as any combination thereof.

The multimedia environment 102 may include one or more content servers 138 (also called content providers 138). Each content server 138 may be configured to communicate with network 134.

Each content server 138 may store content 140 and metadata 142. Content 140 may include any combination of music, videos, movies, TV programs, multimedia, images, still pictures, text, graphics, gaming applications, advertisements, programming content, public service content, government content, local community content, software, and/or any other content or data objects in electronic form.

Metadata 142 may include data about content 140. For example, metadata 142 may include associated or ancillary information indicating or related to writer, director, producer, composer, artist, actor, summary, chapters, production, history, year, trailers, alternate versions, related content, applications, and/or any other information pertaining or relating to the content 140. Metadata 142 may also or alternatively include links to any such information pertaining or relating to the content 140. Metadata 142 may also or alternatively include one or more indexes of content 140, such as but not limited to a trick mode index.

A user 118A in home 104A may use his remote control 110A to control the media device 106A, speaker 108A, display device 112A, and/or watch 114. The same is true for user 118B in home 104B. The remote control 110 can be any component, part, apparatus and/or method for controlling the electronic devices in homes 104, such as a remote control, a tablet, laptop computer, smartphone, wearable, on-screen controls, integrated control buttons, audio controls, or any combination thereof, to name just a few examples. Users 118 may use their respective remote control 110 to select and playback content, such as a movie, TV show, music, book, application, game, etc.

Consider an example where user 118A in home 104A wishes to pair a second speaker 108C with the media device 106A. In the example of FIG. 1, the second speaker 108C includes a pairing button 116. Thus, in an embodiment similar to the WPS standard, the user 118A may press the pairing button 116 to pair the second speaker 108C with the media device 106A. Doing so opens a discovery or pairing window between the second speaker 108C and the media device 106A, during which time the second speaker 108C and the media device 106A may be paired.

But there is a technical problem with this approach, because the second speaker 108C could incorrectly pair with the watch 114, or the user 118A's cell phone (not shown in FIG. 1), or some other device in home 104A. Or, if home 104A is physically close to home 104B, the second speaker 108C could incorrectly pair with the media device 106B in home 104B. Such incorrect pairings could result if, at the time the user 118A presses the pairing button 116 in the second speaker 108C, pairing windows happen to be open with the watch 114, the user 118A's cell phone and/or the media device 106B in home 104B.

To address this problem, an approach similar to the WPS PIN approach could be used where the user 118A keys in a PIN. But, this is not a viable approach where the device being paired does not have a keypad, as is the case with the keypad-less speaker 108C in the example of FIG. 1.

Figure 2:
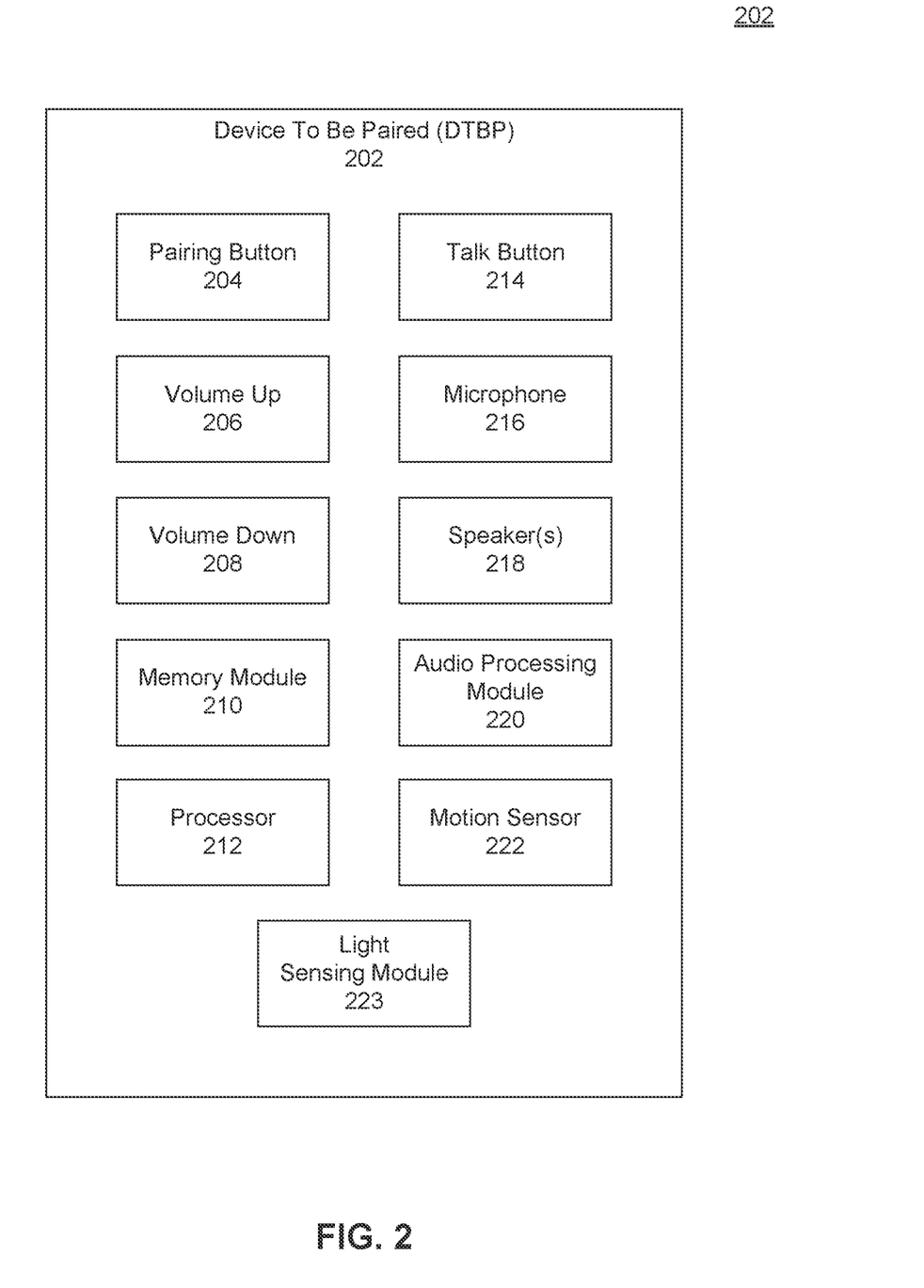
FIG. 2 illustrates a block diagram of an electronic device that is to be paired (DTBP), according to some embodiments.

FIG. 2 is a block diagram of an electronic device 202, according to some embodiments. Electronic device 202 may be configured to be paired with other electronic devices. For example, electronic device 202 could be the second speaker 108C that is configured to be paired with the media device 106A. Or, electronic device 202 could be a newly purchased remote control (not shown in FIG. 1) that is configured to be paired with the media device 106A and/or another device in home 104A, such as speaker(s) 108, display device 112, wearable 114, etc. Thus, herein, electronic device 202 may also be called a device to be paired (DTBP) 202.

The DTBP 202 may include a memory module 210, processor 212, microphone, speaker(s) 218, an audio processing module 220 and/or a motion sensor 222. The processor 212 may operate according to instructions contained in the memory module 210 to cause the DTBP 202 to operate as described herein.

The DTBP 202 may also include a limited number of user accessible control buttons, such as a pairing button 204, volume up button 206, volume down button 208 and/or a talk button 214. These user control buttons may be physical or virtual (such as on a touch screen). In some embodiments, the DTBP 202 is keypad-less and thus does not include a partial or full alphanumeric keypad, but instead includes only these limited user accessible control buttons. Also in some embodiments, the DTBP 202 does not have a keypad and does not include any user accessible control buttons.

Figure 3:
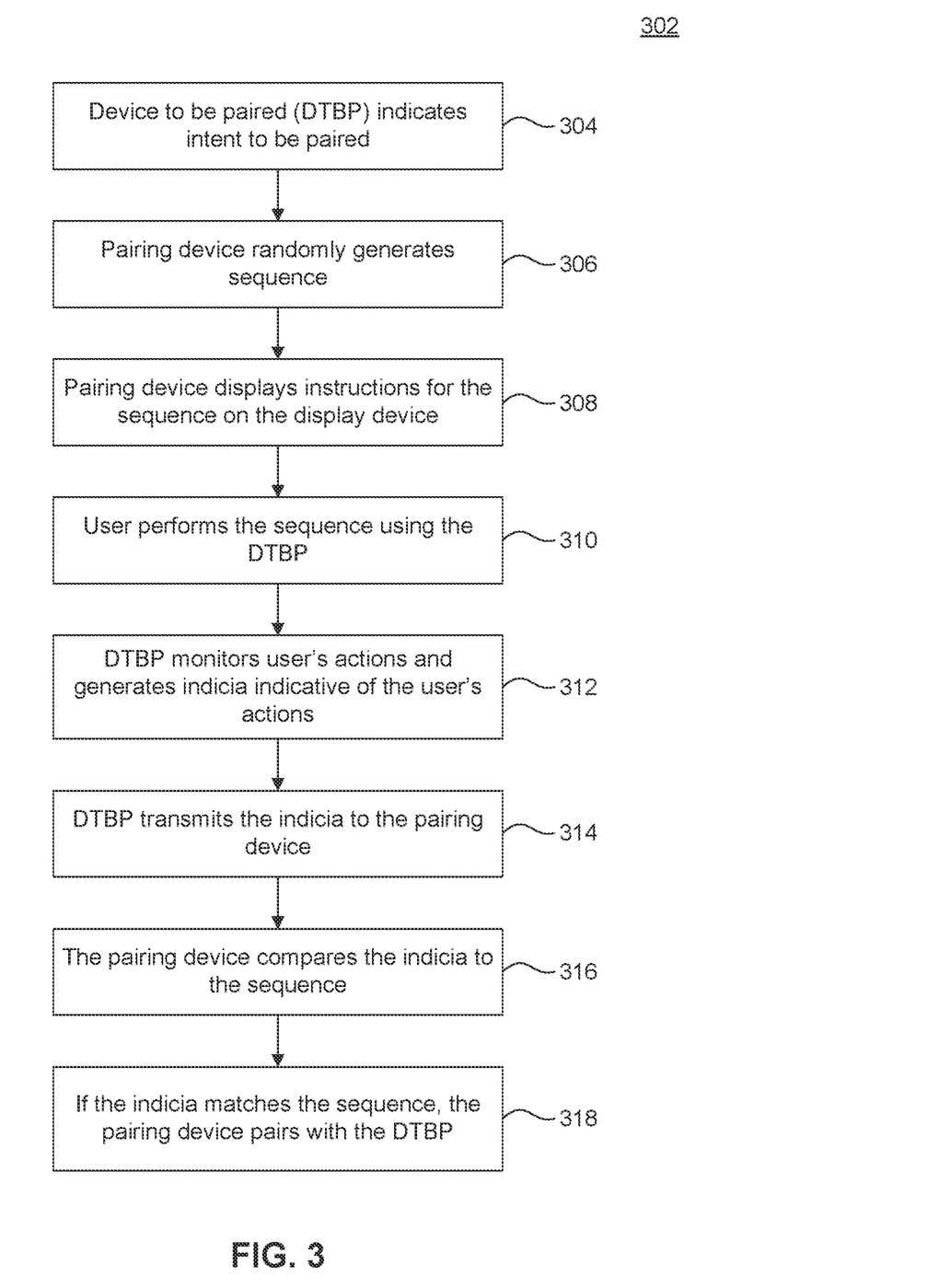
FIG. 3 illustrates a flowchart for more securely pairing devices, according to some embodiments.

FIG. 3 is a flowchart of a method 302 for more securely pairing electronic devices using non-WPS approaches, according to some embodiments. Method 302 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 302 shall be described with reference to FIGS. 1 and 2. However, method 302 is not limited to those example embodiments.

In 304, an electronic device (or an user associated with the electronic device) may indicate its intent to be paired with another electronic device, system, module, object or entity. In an embodiment, the device that is being paired may be configured as the DTBP 202 shown in FIG. 2. Also, in an embodiment, the DTBP 202 may be the speaker 108C that wishes to be paired with the media device 106A. However, it should be understood that this disclosure is not limited to that example. Instead, the DTBP 202 and the device that DTBP 202 is being paired to (also sometimes called the pairing device) can be any electronic devices in a multimedia environment 102, including remote control 110, display device 112, watch 114, other speakers 108, and/or other media devices 106, to name just some examples.

In an example embodiment, in 304, the user 118A may press the pairing button 204 to indicate his desire to pair the DTBP 202 (that is, the speaker 108C) with the media device 106A. In response, the DTBP 202 may open a pairing window during with time the pairing must be performed. Also, the DTPB 202 may generate and broadcast a pairing message to advertise its intent to be paired. The pairing message may be broadcast by any means, such as WIFI, cellular, infrared, etc.

In some embodiments, the pairing message is not specific to the media device 106A; thus, any electronic device that receives the pairing message may attempt to pair with the DTBP 202.

The pairing message may include information that specifies the configuration and capabilities of the particular DTBP 202 who generated the pairing message. With regard to the example of FIG. 2, the information in the pairing message may specific that the DTBP 202 includes a pairing button 204, volume up button 206, volume down button 208 and talk button 214. The information in the pairing message may also specific that the DTBP 202 has a microphone 216, speakers 218 and a motion sensor 222, and can receive and recognize spoken words and also sense motion of the DTBP 202. Also or alternatively, the pairing message may include a code or other information identifying the DTBP 202 or the device type of the DTBP 202.

In 306, in response to receiving the pairing message, the pairing device may generate a sequence. As referred to herein, the pairing device is the electronic device that the DTBP 202 wishes to pair to. Thus, in the above example, the pairing device is the media device 106A.

In some embodiments, the sequence includes an ordered list of actions that the user 118A must perform in the designated order to perform the pairing. The actions in the sequence are ones that the user 118A can perform given the configuration and capabilities of the DTBP 202 that transmitted the pairing message in step 304. For example, the DTBP 202 of FIG. 2 has a limited number of user accessible control buttons (the pairing button 204, volume up button 206, volume down button 208 and talk button 214), but does not have an alphanumeric keyboard. Thus, a sequence for the DTBP 202 of FIG. 2 cannot include: <press a>, <press b>, <press 2>. But, an appropriate sequence for DTBP 202 may be: <press the volume up button 206>, <press the volume down button 208>, <press the talk button 214>, <press the volume up button 206>. More example sequences are described below.

Thus, in 306, the media device 106A generates the sequence according to the configuration and capabilities of the speaker 108C, such that the actions in the sequence are ones that can be performed by the user 118A using the speaker 108C. As noted above, a listing of such configuration and capabilities of the speaker 108C may be contained in the pairing message generated in 304. As also noted above, the pairing message may include a code or other information identifying the DTBP 202 or the device type of the DTBP 202. Accordingly, the media device 106A may also or alternatively access a local or remote lookup table using the code contained in the pairing message, to retrieve information specifying the configuration and capabilities of the speaker 108C.

The sequence may be time based and/or time limited. For example, the user 118A may be instructed to perform the first action in the sequence after the expiration of a countdown, such as "5, 4, 3, 2, 1, now perform the action." Also or alternatively, the user 118A may be required to perform the actions of the sequence within a specified amount of time, and/or wait an indicated amount of time between performing certain actions.

In some embodiments, the pairing device in 306 may randomly generate the sequence in order to better ensure the sequence is unique. In other words, the pairing device 306 may randomly select the actions for the sequence, the ordering of the actions, and the timing of the actions. By doing so, the likelihood that the DTBP 202 incorrectly pairs with another electronic device that also happens to have a pairing window open is reduced.

In 308, the pairing device displays instructions for performing the sequence on the display device 112A. For example, the media device 106 may display on the display device 112A instructions such as shown in Table 1:

Table 1:

At the end of the countdown timer of 5 seconds, press these buttons on the speaker. The buttons must be pressed within 10 seconds after the end of the countdown.

<press the volume up button 206>
<press the volume down button 208>
<press the talk button 214>
<press the volume up button 206>

In addition to displaying the above instructions on the display device 112A, the media device 106A may display the countdown timer on the display device 112A, as well as another timer showing the user 118A how much time he has left to press the buttons on the speaker 108C according to the instructions.

Also or alternatively, in 308, the media device 106A may audibly output the instructions using its local speakers (not shown in FIG. 1), or speakers 218 contained in the DTBP 202.

In 310, the user 118A may perform the actions of the sequence as instructed in 308 using the DTBP 202.

In 312, the DTBP 202 may monitor the actions of the user 118A while performing step 310, and generate indicia (or other information) that details the actions that the user 118A took. For example, for the above sequence and instructions, the indicia may include the information shown in Table 2:

Table 2:

Time user waited to begin sequence: 5 seconds
Buttons pressed by user: volume up button 206; volume down button 208; talk button 214; volume up button 206
Time user took to press the buttons: 8 seconds In 314, the DTBP 202 may transmit the indicia to the pairing device. For example, the speaker 108C may transmit the indicia to the media device 106A using any means such as WIFI, cellular, infrared, etc. In some embodiments, the DTBP 202 may broadcast the indicia without any specific destination or recipient.

In 316, the pairing device may receive the indicia, and may compare the received indicia to the sequence generated in 306. For example, the media device 106A in 316 may compare the information in Table 2 to the sequence generated in 306, including any time related aspects of the sequence (such as whether there was a countdown timer, a requirement that the sequence be completed within a predetermined time period, timing between actions, etc.).

In 318, if the received indicia matches the sequence generated in 306, then the pairing device may pair with the DTBP 202. For example, if the received indicia matches the sequence generated in 306, the media device 106A may pair with the speaker 108C.

Sequence Examples

According to various embodiments, the sequences generated in 306 may include a number of user actions. Examples of such actions are described below. However, it should be understood that this disclosure is not limited to these actions. Instead, sequences may include any actions that can be performed by users given the configuration, capabilities and functionalities of the device being paired.

Ordered List of Actions with Specific Timing

As described above, a sequence may include pressing buttons on the DTBP 202, and the sequence may include specific timing. Instructions for an example sequence (that are displayed in 308) could be "Get ready to pair your device", "Press the pairing button now and hold it, get ready to release it", then there is a countdown "5, 4, 3, 2, 1", "Now immediately release the pairing button".

Actions that Include Motions

In some embodiments, the actions are not limited to pressing buttons on the DTBP 202. Instead, the actions may also include the user 118A moving the DTBP 202. The motions may include shaking the DTBP 202, moving the DTBP 202 to the right, left, up, down, forward, backward, etc. Motions of the DTBP 202 may be detected by the motion sensor 222.

In some embodiments, action motions are appropriate for a DTBP 202 that is small and lightweight and thus something that users 118A can easily hold and move, such as remote controls 110 or small speakers 108.

Instructions for an example sequence (that are displayed in 308) that mixes button presses with motion actions could be "Get ready to pair your device", "Press the talk button now and hold it, get ready to release it", then there is a countdown "3, 2, 1", "Now immediately release the talk button", "Now move the device up", "Now move the device to the left", "Now press the volume up button and hold it, get ready to release it", then there is a countdown "5, 4, 3, 2, 1", "Now immediately release the volume up button".

Actions that Include Voice or Tone Input

In some embodiments, actions may include instructing the user 118A to say a word or phrase. Words spoken by the user 118A (that is, audio data) may be received using the microphone 216 and recognized using the audio processing module 220 of the DTBP 202. Also or alternatively, audio data may be processed and recognized using an audio processing server (not shown in FIG. 1) that is accessible via the network 134.

Examples for receiving, processing and recognizing audio data locally and/or over a network are described in U.S. patent application Ser. No. 15/341,552 titled "Improved Reception Of Audio Commands," filed Nov. 2, 2016; U.S. patent application Ser. No. 15/646,379 titled "Controlling Visual Indicators In An Audio Responsive Electronic Device, and Capturing and Providing Audio Using an API, By Native and Non-Native Computing Devices and Services," filed Jul. 11, 2017; and U.S. patent application Ser. No. 15/895,047 titled "Trigger Word Detection With Multiple Digital Assistants," filed Feb. 13, 2018, all of which are herein incorporated by reference in their entireties.

Instructions for an example sequence (that are displayed in 308) that mixes button pushes, motion actions and voice input actions could be "Get ready to pair your device", "Press the talk button now and hold it, get ready to release it", then there is a countdown "3, 2, 1", "Now immediately release the talk button", "Now move the device up", "Now get read to say Pair Me", then there is a countdown "3, 2, 1", "Now say Pair Me".

In some embodiments, the microphone 216 of the DTBP 202 may be used to listen to a tone or tone combination that is played from the speakers 108 of the pairing device 106. A benefit is that such tone recognition could require significantly less processing as well as a more robust set of unique combinations. In this embodiment, the user 118 in 304 may press a button on the DTBP 202, such as the pairing button 204. In response, in 306, the pairing device (such as media device 106) plays a short burst of tones via speakers 108. In some embodiments, if the display device 112 is low volume or muted, the media device 106 commands the display device 112 to be un-muted and set to a higher volume for the pairing procedure, to better enable the DTBP 202 to receive the tones. These tones may be received by the microphone 216 of the DTBP 202 to complete the pairing. It is noted that this example represents a sequence that does not require any actions by the user 118, other than the initial action of pressing a button to start the pairing process.

Actions that Include Image Sensing

In some embodiments, the DTBP 202 includes a light sensing module 223. The light sensing module 223 can be a camera or any light sensor capable of detecting a sequence of flashes or images. Such embodiments may involve sequences that involve image sensing using the light sensing module 223.

Instructions for an example sequence (that are displayed in 308) that involve image sensing could be "Get ready to pair your device", "Point your device at the TV", then there is a countdown "5, 4, 3, 2, 1", "Now point your device away from the TV". During the countdown from 5 to 1, the pairing device (such as the media device 106) may cause a particular pattern of lights, colors, flashes, pulses, intensity, etc., to be displayed on the display device 112 (that is, the TV). In steps 312 and 314, the light sensing module 223 of the DTBP 202 receives the pattern displayed on the TV, and transmits indicia representative of the received pattern to the pairing device. In 316, the pairing device compares the indicia to the sequence and, if they match, the pairing is completed in step 318.

It is noted that the pairing device (that is, the media device 106) may cause images/patterns to be display on the display device 112 for some amount of time after the countdown ends. But, if the user 118 does not move the DTBP 202 away from the TV at the conclusion of the countdown (as instructed), then the comparison may fail in step 318.

Example Computer System

Figure 4:
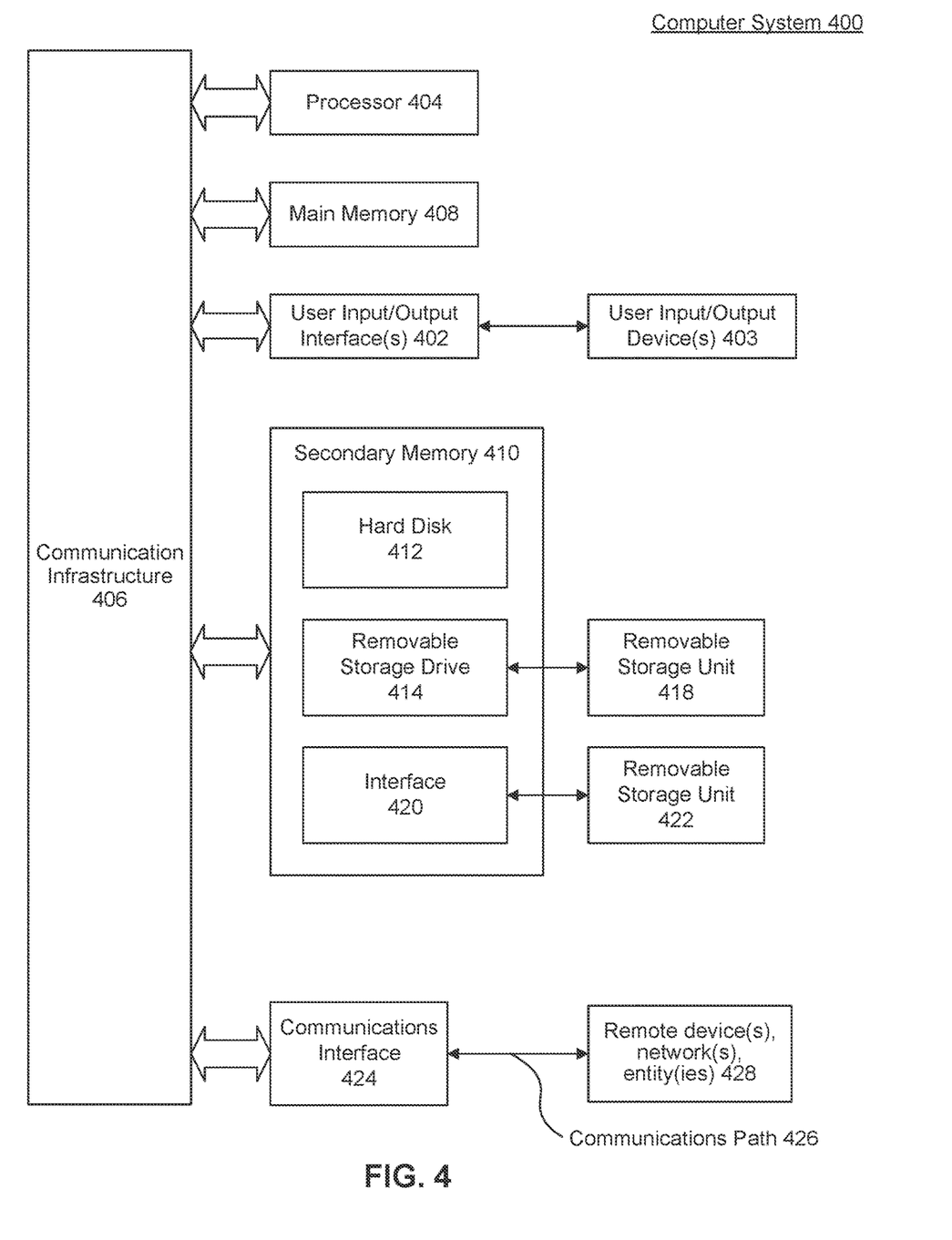
FIG. 4 illustrates an example computer system useful for implementing various embodiments.

Various embodiments and/or components therein can be implemented, for example, using one or more computer systems, such as computer system 400 shown in FIG. 4. Computer system 400 can be any computer or computing device capable of performing the functions described herein. For example, one or more computer systems 400 or portions thereof can be used to implement any embodiments of FIGS. 1-3, and/or any combination or sub-combination thereof.

Computer system 400 includes one or more processors (also called central processing units, or CPUs), such as a processor 404. Processor 404 is connected to a communication infrastructure or bus 406.

One or more processors 404 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 can include one or more levels of cache. Main memory 408 has stored therein control logic (i.e., computer software) and/or data.

Computer system 400 can also include one or more secondary storage devices or memory 410. Secondary memory 410 can include, for example, a hard disk drive 412 and/or a removable storage device or drive 414. Removable storage drive 414 can be a floppy disk drive, a magnetic tape drive, a compact disk drive, an optical storage device, tape backup device, and/or any other storage device/drive.

Removable storage drive 414 can interact with a removable storage unit 418. Removable storage unit 418 includes a computer usable or readable storage device having stored thereon computer software (control logic) and/or data. Removable storage unit 418 can be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 can include other means, instrumentalities or other approaches for allowing computer programs and/or other instructions and/or data to be accessed by computer system 400. Such means, instrumentalities or other approaches can include, for example, a removable storage unit 422 and an interface 420. Examples of the removable storage unit 422 and the interface 420 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 can further include a communication or network interface 424. Communication interface 424 enables computer system 400 to communicate and interact with any combination of remote devices, remote networks, remote entities, etc. (individually and collectively referenced by reference number 428). For example, communication interface 424 can allow computer system 400 to communicate with remote devices 428 over communications path 426, which can be wired and/or wireless, and which can include any combination of LANs, WANs, the Internet, etc. Control logic and/or data can be transmitted to and from computer system 400 via communication path 426.

In some embodiments, a non-transitory, tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:
1. A method comprising:
receiving, at a first device, a pairing message from a second device requesting a pairing between the second device and the first device;

determining, by the first device, user-accessible features comprising a plurality of buttons of the second device that are accessible for the pairing, wherein the user-accessible features do not include an alphanumeric keypad on the second device;

generating, by the first device, a sequence of actions to be performed using at least a subset of the plurality of buttons of the second device, based on the user-accessible features of the second device for the pairing;

displaying, on a display device communicatively coupled to the first device and independent of the second device, the sequence of actions including the subset of the plurality of buttons to be pressed on the second device;

receiving indicia indicating which actions were performed using the subset of the plurality of buttons of the second device;

comparing the indicia to the displayed sequence of actions; and pairing the first device with the second device based on a determination that the indicia corresponds to the displayed sequences of actions.

2. The method of claim 1, wherein the user-accessible features comprise one or more physical buttons on the second device.

3. The method of claim 1, wherein the second device does not include a user interface.

4. The method of claim 1, wherein the sequence of actions comprises receiving audio of one or more spoken words.

5. The method of claim 1, wherein the sequence of actions comprises shaking the second device.

6. The method of claim 1, wherein the sequence of actions comprises moving the second device in a specified direction.

7. The method of claim 6, wherein the sequence of actions comprises both moving the second device in the specified direction and receiving a spoken word.

8. The method of claim 1, wherein the displaying comprises displaying a timer indicating a period of time within which the sequence of actions need to be completed for the pairing.

9. A system, comprising:
a memory; and
at least one processor coupled to the memory and configured to perform operations comprising:
receiving, at a first device, a pairing message from a second device requesting a pairing between the second device and the first device;
determining, by the first device, user-accessible features comprising a plurality of buttons of the second device that are accessible for the pairing, wherein the user-accessible features do not include an alphanumeric keypad on the second device;
generating, by the first device, a sequence of actions to be performed using at least a subset of the plurality of buttons of the second device, based on the user-accessible features of the second device for the pairing;
displaying, on a display device communicatively coupled to the first device and independent of the second device, the sequence of actions including the subset of the plurality of buttons to be pressed on the second device;
receiving indicia indicating which actions were performed using the subset of the plurality of buttons of the second device;
comparing the indicia to the displayed sequence of actions; and
pairing the first device with the second device based on a determination that the indicia corresponds to the displayed sequences of actions.

10. The system of claim 9, wherein the user-accessible features comprise one or more physical buttons on the second device.

11. The system of claim 9, wherein the second device does not include a user interface.

12. The system of claim 9, wherein the sequence of actions comprises receiving audio of one or more spoken words.

13. The system of claim 9, wherein the sequence of actions comprises shaking the second device.

14. The system of claim 9, wherein the sequence of actions comprises moving the second device in a specified direction.

15. The system of claim 14, wherein the sequence of actions comprises both moving the second device in the specified direction and receiving a spoken word.

16. A non-transitory processor-readable medium having one or more instructions operational on a client device which, when executed by a processor, cause the client device to perform operations comprising:
receiving, at a first device, a pairing message from a second device requesting a pairing between the second device and the first device;
determining, by the first device, user-accessible features comprising a plurality of buttons of the second device that are accessible for the pairing, wherein the user-accessible features do not include an alphanumeric keypad on the second device;
generating, by the first device, a sequence of actions to be performed using at least a subset of the plurality of buttons of the second device, based on the user-accessible features of the second device for the pairing;
displaying, on a display device communicatively coupled to the first device and independent of the second device, the sequence of actions including the subset of the plurality of buttons to be pressed on the second device;
receiving indicia indicating which actions were performed using the subset of the plurality of buttons of the second device;
comparing the indicia to the displayed sequence of actions; and
pairing the first device with the second device based on a determination that the indicia corresponds to the displayed sequences of actions.

17. The non-transitory processor-readable medium of claim 16, wherein the second device does not include a user interface.

18. The non-transitory processor-readable medium of claim 16, wherein the sequence of actions comprises receiving audio of one or more spoken words.

19. The non-transitory processor-readable medium of claim 16, wherein the sequence of actions comprises shaking the second device.

20. The non-transitory processor-readable medium of claim 16, wherein the sequence of actions comprises moving the second device in a specified direction, and wherein the sequence of actions comprises both moving the second device in the specified direction and receiving a spoken word.

* * * * *

UNITED STATES PATENT AND TRADEMARK OFFICE
CERTIFICATE OF CORRECTION

PATENT NO. : 11,889,566 B2
APPLICATION NO. : 17/527562
DATED : January 30, 2024
INVENTOR(S) : Sassenrath It is certified that error appears in the above-identified patent and that said Letters Patent is hereby corrected as shown below:

In the Specification

In Column 4, Line 58, delete "an" and insert -- a --, therefor.

Signed and Sealed this
Fourth Day of June, 2024

Katherine Kelly Vidal
*Director of the United States Patent and Trademark Office*